United States Patent [19]

Seto et al.

[11] Patent Number: 6,125,731
[45] Date of Patent: *Oct. 3, 2000

[54] FEEDER FOR AN INDUSTRIAL MACHINE, PARTICULARLY A TURRET PUNCH PRESS, AND AN INDUSTRIAL MACHINE UTILIZING THE SAME

[75] Inventors: Yoshiharu Seto; Shunzo Hirose, both of La Mirada, Calif.

[73] Assignee: Amada MFG America Inc., La Mirada, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,079

[22] Filed: Jul. 29, 1997

Related U.S. Application Data

[60] Provisional application No. 60/046,578, May 15, 1997.

[51] Int. Cl.$^7$ ........................................ B26D 7/01
[52] U.S. Cl. ........................... 83/437.4; 83/552; 74/89.15
[58] Field of Search ...................... 83/552, 437.4, 83/732, 733, 734; 72/420, 405.16; 318/3, 4, 5, 8, 11, 15, 560, 561, 571, 626; 74/89.15

[56] References Cited

U.S. PATENT DOCUMENTS

| | | |
|---|---|---|
| 4,939,946 | 7/1990 | Teramachi ............................. 74/89.15 |
| 5,012,687 | 5/1991 | Hoshide ................................ 74/89.15 |
| 5,094,118 | 3/1992 | Morita .................................. 74/89.15 |
| 5,121,647 | 6/1992 | Teramachi ............................. 74/89.15 |
| 5,193,409 | 3/1993 | Babinski ............................... 74/89.15 |
| 5,228,353 | 7/1993 | Katahira et al. ...................... 74/89.15 |
| 5,291,647 | 3/1994 | Fukasawa et al. ....................... 83/552 |
| 5,531,557 | 7/1996 | Springer .............................. 74/89.15 |

*Primary Examiner*—Rinaldi I. Rada
*Assistant Examiner*—Kim Ngoc Tran
*Attorney, Agent, or Firm*—Blank, Rome, Comisky & McCauley LLP

[57] ABSTRACT

A ball screw spline shaft 41 is driven for rotation by a drive motor 53 provided at least on one end thereof. When a feeder ball nut 61 moves in response to the rotation of the ball screw spline shaft 41 from one end of the ball screw spline shaft 41 toward the other end, intermediate supports 65 on both sides thereof travel in the same direction at a lower speed on a support guide 67 and the ball screw spline shaft 41. As a result, the intermediate supports 65 on both sides are located in positions around the middle of the distances between the feeder ball nut and both of the ends and moves while supporting the ball screw spline shaft 41. This increases the critical speed of the ball screw spline shaft 41 to increase the speed of rotation of the ball screw spline shaft 41.

16 Claims, 10 Drawing Sheets

FIG.6
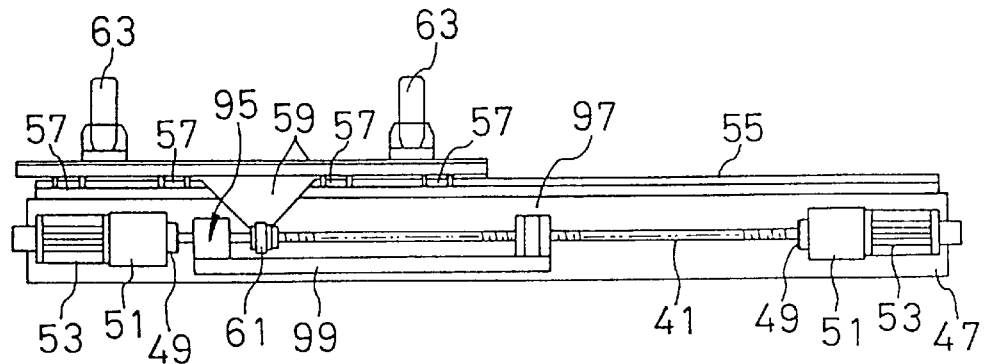
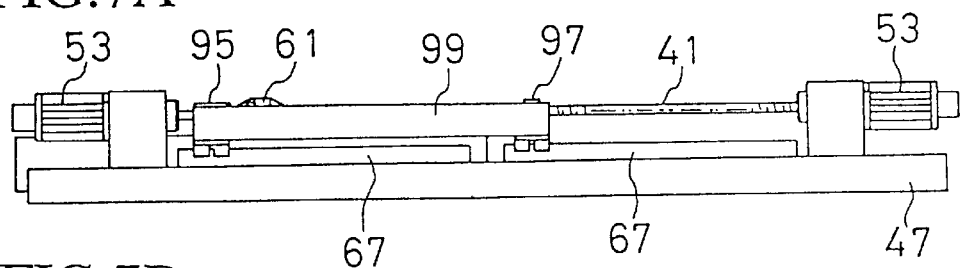
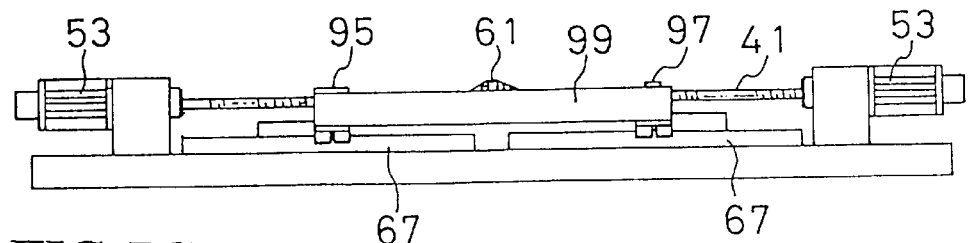
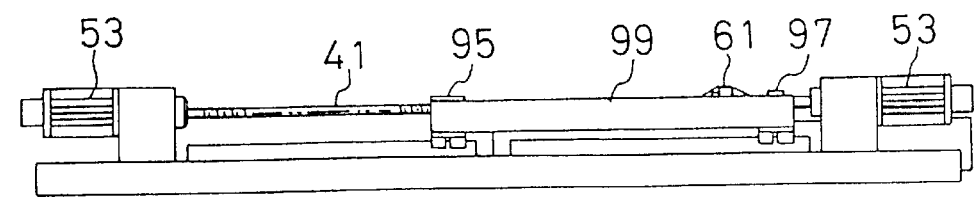

FEEDER FOR AN INDUSTRIAL MACHINE, PARTICULARLY A TURRET PUNCH PRESS, AND AN INDUSTRIAL MACHINE UTILIZING THE SAME

This application claims benefit of provisional application Ser. No. 60/046,578 filed May 15, 1997.

BACKGROUND OF THE INVENTION

1. Field of the Invention

The present invention relates to a feeder for an industrial machine for feeding a workpiece, a working head and the like and an industrial machine such as a plate working machine or transport Apparatus and, more particularly, to a feeder for an industrial machine capable of positioning a workpiece, a working head and the like at a high speed and to an industrial machine utilizing the same.

2. Description of the Related Art

In a workpiece feeder of a work table of a plate working machine such as a punch press in the related art, both ends of a ball screw are rotatably supported by bearings, and drive motor is provided on one end of the ball screw with rotation transmission such as gear mechanism interposed therebetween. Meanwhile, a ball nut that engages the ball screw is mounted on the lower side of a work table having a slider which is movable along a guide rail provided in a feeding direction.

Therefore, when the drive motor drives the ball screw for rotation in a direction through the rotation transmission such as the gear mechanism, the ball nut moves along the ball screw and, as a result, the work table reciprocates in the feeding direction.

In the workpiece feeder having the drive motor on one end of the ball screw, a higher speed is achieved by increasing the height of the lead of the ball screw.

Referring to critical speed of the ball screw, the ball screw may be disabled from rotating due to resonance associated with the natural frequency of itself at a high speed of rotation. Such a resonance point is referred to as the "critical speed" of the ball screw.

However, a problem has arisen in that a limit is placed by the critical speed of the ball screw when the ball screw is long.

Specifically, a problem has arisen in that if the critical speed of the ball screw is lower than the maximum speed of rotation of the drive motors provided on both ends of the ball screw, the critical speed of the ball screw becomes the maximum speed of the workpiece feeder.

For the reason described above, there has been a problem in that the maximum speed becomes lower according as the ball screw is longer.

SUMMARY OF THE INVENTION

The present invention has been conceived in order to solve the problem as described above, and it is an object of the present invention to provide a feeder for an industrial machine with which feeding and positioning can be carried out at a high speed by increasing the maximum speed of a screw shaft of a ball screw or the like, and to provide an industrial machine utilizing the same.

In order to achieve the above-described object, according to a first aspect of the invention, there is provided a feeder for an industrial machine, comprising: a ball screw spline shaft formed with a ball screw thread groove and a ball spline groove in a crossing relationship with each other and rotatably supported on both ends thereof; a drive motor provided on at least one end of the ball screw spline shaft; a feeder ball nut engaged with the ball screw spline shaft; an object to be fed to which the feeder ball nut is attached; an intermediate support driven by the rotation of the ball screw spline shaft for movement on the ball screw spline shaft in the same direction as the feeder ball nut at a speed which is at least equal to or lower than the moving speed of the feeder ball nut; and a support guide for guiding the intermediate support in a manner such that the intermediate support is movably supported.

Thus, by providing the intermediate support in a position apart from the feeder ball nut in advance, even if the feeder ball nut moves away from the end of the ball screw spline shaft, the portion between the feeder ball nut and the end of the ball screw spline shaft is supported by the intermediate support because the intermediate support moves in the same direction as the feeder ball nut. As a result, a critical speed of the ball screw spline shaft is increased. This makes it possible to increase the speed of rotation of the ball screw spline shaft, thereby allowing feeding at a higher speed.

According to a second aspect of the invention, there is provided a feeder for an industrial machine, comprising: a ball screw spline shaft formed with a ball screw thread groove and a ball spline groove in a crossed relationship with each other and rotatably supported on both ends thereof; a drive motor provided on at least one end of the ball screw spline shaft; a feeder ball nut engaged with the ball screw spline shaft; an object to be fed to which the feeder ball nut is attached; intermediate supports driven by the rotation of the ball screw spline shaft for movement on the ball screw spline shaft in the same direction as the feeder ball nut at a speed which is lower than the moving speed of the feeder ball nut, the intermediate supports arranged on both sides of the feeder ball nut; and a support guide for guiding the intermediate supports in a manner such that the intermediate supports are movably supported.

Thus, when the ball screw spline shaft is driven by the drive motor for rotation, the feeder ball nut moves on the ball screw spline shaft and, as a result, a workpiece held by the object to be fed is transported. As the ball screw spline shaft rotates, in addition to the feeder ball nut, the intermediate supports also travel on the support guide and the ball screw spline shaft in the same direction as the feeder ball nut at the speed lower than the moving speed of the feeder ball nut.

The intermediate supports on both sides of the feeder ball nut are arranged in positions with a certain predetermined distance from each other. For example, when the feeder ball nut moves away from one end of the ball screw spline shaft toward the other end, the intermediate supports on both sides of the nut move in the same direction. The feeder ball nut moves such that it gradually becomes more apart from the intermediate support on one side thereof and closer to the intermediate support on the other side thereof.

As described above, even while the feeder ball nut is moving, the ball screw spline shaft is supported by the intermediate supports on both sides of the feeder ball nut at points at a certain interval therebetween. Thus, the critical speed of the ball screw spline shaft is increased. This applies to a ball screw spline shaft whether the ball screw spline is long or short and this allows the speed of rotation of a ball screw spline shaft to be increased, thereby achieving feeding at a higher speed.

In other words, when the ball screw spline shaft is driven by the drive motor for rotation, the feeder ball nut provided on a workpiece supporting member which supports and transfers the workpiece moves on the ball screw spline shaft. In addition to the motion of the feeder ball nut, the intermediate supports arranged on the both sides of the feeder ball nut also travel on the support guide and the ball screw spline shaft in the same direction as the feeder ball nut at the speed lower than the moving speed of the feeder ball nut.

Accordingly, even the feeder ball nut is moved on the ball screw spline shaft in the almost whole length thereof, since each intermediate support is moved on the ball screw spline shaft in the partial length thereof. Therefore, even during the feeder ball nut is moved, the intermediate support is able to support a middle portion of the ball screw spline shaft between the feeder ball nut and the end of the ball screw spline shaft, thereby a critical speed of the ball screw spline shaft is increased.

In addition, this applies to a ball screw spline shaft whether the ball screw spline is long or short and this allows the speed of rotation of a ball screw spline shaft to be increased, thereby the speed of feeding workpiece is achieved at a high rate.

According to a third aspect of the present invention, as it depends from the first or second aspect, the intermediate support further includes an intermediate support main body movably provided on the support guide; a spline sleeve engaged with the ball spline groove of the ball screw spline shaft and rotatably provided in the intermediate support main body; an intermediate ball nut engaged with the ball screw thread groove on the ball screw spline shaft and rotatably provided in the intermediate support main body; and a speed-converting rotation transmission for transmitting the rotation of the spline sleeve to the intermediate ball nut in the same direction with the speed of rotation converted.

Thus, as the ball screw spline shaft rotates, the spline sleeve engaged with the ball spline groove on the ball screw spline shaft rotates within the intermediate support main body in the same direction at the same speed. The speed of rotation of the spline sleeve is converted by the speed converting rotation transmission into a lower speed which is transmitted to the intermediate ball nut. Thus, the intermediate ball nut rotates in the same direction as the spline sleeve at a lower speed.

Since the intermediate ball nut rotates in the same direction as the ball screw spline shaft, the difference between the speeds of rotation of the intermediate ball nut and the ball screw spline shaft establishes a relative moving speed of the intermediate ball nut. Thus, the moving speed of the intermediate ball nut is lower than that of the feeder ball nut. That is, the intermediate support moves at a speed lower than that of the feeder ball nut.

In other words, since the intermediate ball nut meshes with the ball screw thread groove of the ball screw spline shaft and rotates in the same direction as the ball screw spline shaft, the difference between the speeds of rotation of the intermediate ball nut and the ball screw spline shaft establishes a relative moving speed of the intermediate ball nut. Thus, the moving speed of the intermediate ball nut is lower than that of the feeder ball nut. That is, the intermediate support moves at a speed lower than that of the feeder ball nut.

The use of the spline sleeve engaged with the ball spline groove and intermediate ball nut provides the intermediate support with high durability and high reliability.

According to a fourth aspect of the invention, as it depends from the second or the third aspect, the intermediate supports are arranged on the ball screw spline shaft on both sides of the feeder ball nut; the two intermediate supports are spaced at an interval which is approximately and substantially one-half of the entire length of the ball screw spline shaft; and the moving speed of the intermediate supports is set at one-half of the moving speed of the feeder ball nut.

Accordingly, since the intermediate supports on both sides of the feeder ball nut are thus arranged in positions apart from each other at the interval which is approximately and substantially one-half of the entire length of the ball screw spline shaft, for example, when one of the intermediate supports and the ball nut start moving from one of the ends of the ball screw spline shaft, the other of the intermediate support starts moving toward the other end from the position substantially in the middle of the ball screw spline shaft.

Since the moving speed of the feeder ball nut is twice that of the intermediate supports, the feeder ball nut moves such that it gradually becomes more apart from the one of the intermediate supports and closer to the other of the intermediate supports. The feeder ball nut and the other of the intermediate supports arrive at the other end of the ball screw spline shaft substantially at the same time. The one of the intermediate supports arrives at the position substantially in the middle of the ball screw spline shaft.

In other words, when the feeder ball nut is moved along almost the whole length of the ball screw spline shaft, since the intermediate regions between supporting portions at the ends of the ball screw spline shaft and the feeder ball nut are supported by the intermediate supports arranged on the both sides of the feeder ball nut, the critical speed of a ball screw spline shaft can be increased even though the ball screw spline shaft is long. Since, it is possible to increase the speed of rotation of the ball spline shaft, the feeding speed is achieved to be increased at a higher rate.

As apparent from the above, even the ball screw spline shaft is long, an intermediate region of the long ball screw spline shaft is supported by the intermediate supports. Since the critical speed of a ball screw spline shaft can be thus increased, it is possible to increase the speed of rotation of the ball spline shaft. Then the feeding speed is achieved to be increased at a higher rate.

According to a fifth aspect of the present invention, as it depends from the fourth aspect, the two intermediate supports are coupled to each other with a coupling member; and one of the intermediate supports comprises an intermediate support main body movably provided on the support guide and a spline sleeve engaged with the ball spline groove of the ball screw spline shaft and rotatably provided on the intermediate support main body.

Accordingly, since the two intermediate supports are thus coupled to each other with the coupling member, they move according to the rotation of the ball screw spline shaft if either of the intermediate supports includes the spline sleeve, the intermediate ball nut and the speed-converting rotation transmission. It is sufficient for the other of the intermediate supports to include only a spline sleeve because this provides a capability of supporting the ball screw spline shaft. A cost reduction can be thus achieved for the intermediate ball nut which is omitted.

In other words, since the two intermediate supports are thus coupled to each other with the coupling member, they move according to the rotation of the ball screw spline shaft if either of the intermediate supports includes the spline sleeve, the intermediate ball nut and the speed-converting rotation transmission. It is sufficient for the other of the intermediate supports to include only a spline sleeve because this provides a capability of supporting the ball screw spline shaft. A cost reduction can be thus achieved.

According to a sixth aspect of the present invention, as it depends from the second aspect or third aspect, the plurality of intermediate supports are provided on the ball screw spline shaft on each side of the feeder ball nut; the moving speed of the plurality of intermediate supports are set at a value lower than the moving speed of the feeder ball nut; and the moving speed of intermediate support among the plurality of intermediate supports which is further from the feeder ball nut is set at a value lower than that of the other of the intermediate support which is closer to the feeder ball nut.

Accordingly, for example, this results in an arrangement such that when the one of the plurality of intermediate supports and the feeder ball nut is located at one end of the ball screw spline shaft, the other of the plurality of intermediate supports divides the entire length of the ball screw spline shaft at substantially equal intervals.

While the ball screw spline shaft rotates to move the feeder ball nut from one end of the ball screw spline shaft to the other end thereof, the one of the plurality of intermediate supports moves to divide the distance from the feeder ball nut and this first end of the ball screw spline shaft at substantially equal intervals while expanding the intervals between each other. The other of the intermediate supports on the other side moves to divide the distance between the feeder ball nut and the other end of the ball screw spline shaft at substantially equal intervals while decreasing the interval between each other.

As apparent from the above, even a long ball screw spline shaft is supported at relatively small intervals by the plurality of intermediate supports. Since the critical speed of a ball screw spline shaft can be thus increased, the speed of rotation of the ball screw spline shaft can be increased to feed a workpiece at a higher speed.

According to a seventh aspect of the present invention, there is provide an industrial machine utilizing a feeder, comprising: an erected frame; a plurality of punches supported by the erected frame; a striker for striking the plurality of punches; a ball screw spline shaft formed with a ball screw thread groove and a ball spline groove in a crossing relationship with each other and rotatably supported on both ends thereof; a drive motor provided on at least one end of the ball screw spline shaft; a feeder ball nut engaged with the ball screw spline shaft; an object to be fed to which the feeder ball nut is attached; intermediate supports driven by the rotation of the ball screw spline shaft for movement on the ball screw spline shaft in the same direction as the feeder ball nut at a speed which is lower than the moving speed of the feeder ball nut, the intermediate supports arranged on both sides of the feeder ball nut; and a support guide for guiding the intermediate supports in a manner such that the intermediate supports are movably supported.

According to a eighth aspect of the present invention as it depends from the seventh aspect, the industrial machine further comprising: an upper turret rotatably connected to the erected frame for holding the plurality of punches; and a lower turret rotatably connected to the erected frame for holding the plurality of punches, wherein the industrial machine is a turret punch press.

According to a ninth aspect of the present invention, there is provide an industrial machine comprising: a feeder for an industrial machine according to any one of the first aspect through the sixth aspect.

Therefore, since the object to be fed is moved and positioned by the feeder at a high speed, the object to be fed is efficiently worked by the industrial machine.

According to a tenth aspect of the present invention as it depends from the ninth aspect, the industrial machine is a turret punch press.

Therefore, since the object to be fed is moved and positioned by the feeder at a high speed, it is efficiently punched by the turret punch press.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 6 is a plan view of feeder for a plate working machine as an industrial machine showing an example of another embodiment of the present invention;

FIGS. 7A, 7B and 7C are side views illustrative of operations of the feeder for a plate working machine as an industrial machine shown in FIG. 6, respectively;

DETAILED DESCRIPTION OF THE PREFERRED EMBODIMENTS

Figure 1:
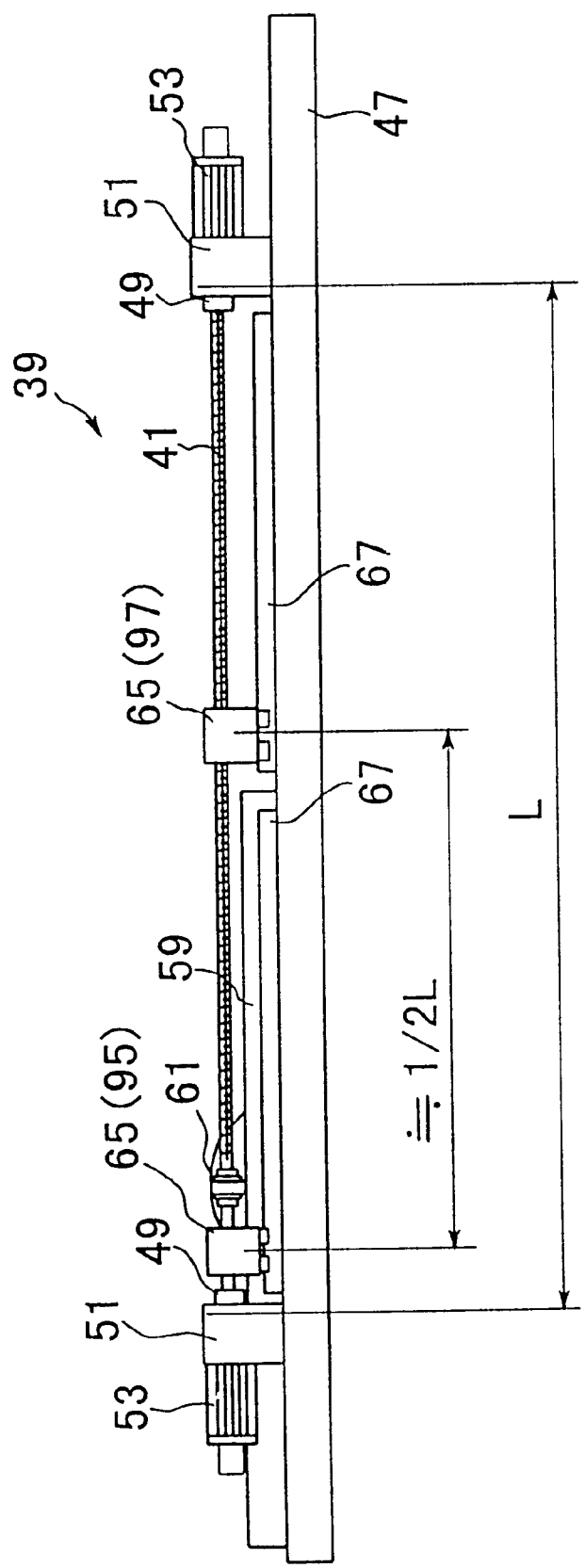
FIG. 1 is a side view of a feeder for a plate working machine as an industrial machine showing an example of the embodiment of the present invention.

There will be detailed below the preferred embodiments of the present invention with reference to the accompanying drawings. Like members are designated by like reference characters.

Embodiments of a feeder for an industrial machine according to the present invention will now be described with reference to drawings by referring to a turret punch press 1 as an example of an industrial machine.

Figure 10:
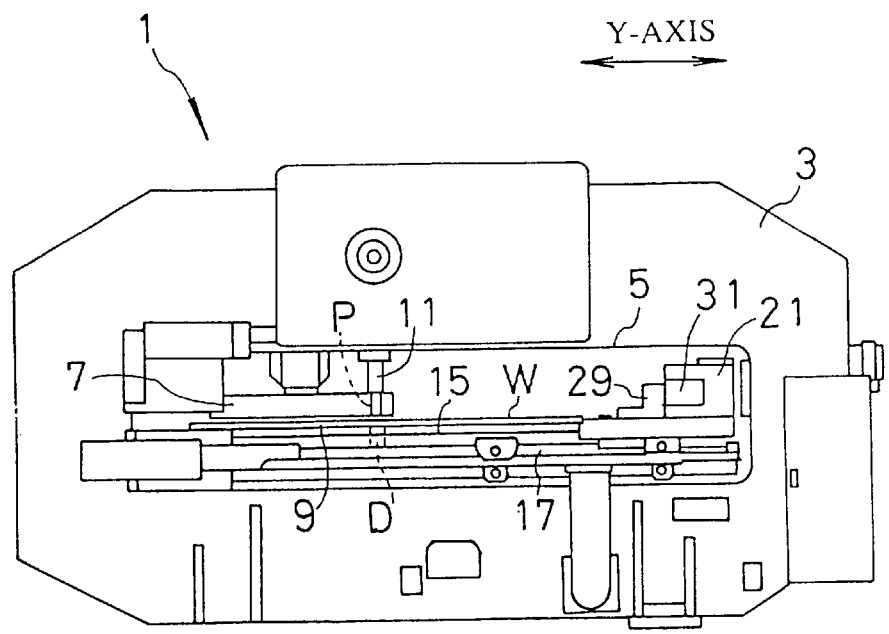
FIG. 10 is a side view of a turret punch press as an industrial machine used in an embodiment of the present invention.
Figure 11:
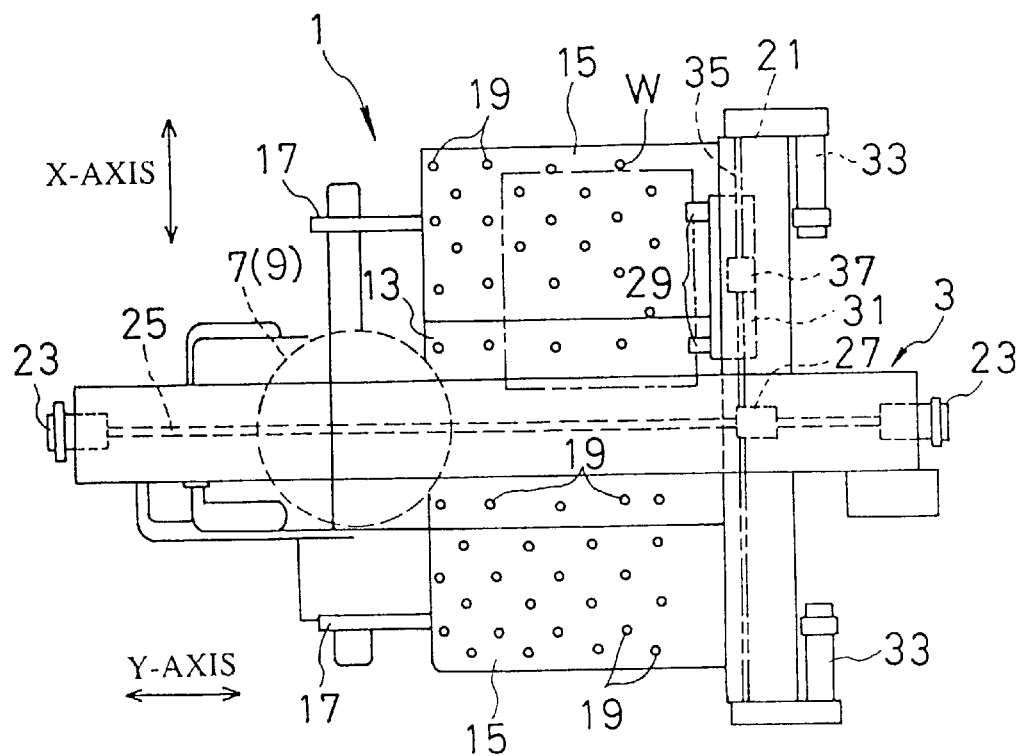
FIG. 11 is a plan view of the turret punch press as an industrial machine used in a mode of the embodiment of the present invention.

Referring to FIGS. 10 and 11, the turret punch press 1 according to the embodiment of the invention includes an erected frame 3 and a gap portion 5 in the center of the frame 3. An upper turret 7 having a plurality of punches P attached thereto and a lower turret 9 having a plurality of dies D attached thereto are respectively provided above and under the gap portion 5 such that each of them can be rotated and indexed. A striker 11 for striking the punches P is provided above the upper turret 7.

Thus, a punch P and a die D are selected as desired, and the striker 11 strikes the punch P which thereby cooperates with the die D to punch a workpiece W positioned between the punch P and the die D.

A fixed table 13 is provided at the gap portion 5, and movable tables 15 are provided on both of the left and right sides (both of the upper and lower sides in FIG. 11) of the fixed table 13. A pair of guide rails 17 are provided under the movable tables 15 so as to extend in a Y-direction (the lateral direction in FIGS. 10 and 11), and a slider not shown which moves along the guide rail 17 is provided on the bottom surface of each of the movable tables 15. Further, a multiplicity of free bearings 19 for movably supporting a workpiece W are provided on the upper surfaces of the fixed table 13 and the movable tables 15.

At the end of the upper surfaces of the movable table 15 shown on the right side of FIG. 11, a carriage base 21 for coupling the left and right movable tables 15 is provided astride the fixed table 13. Therefore, the carriage base 21 moves in the Y-direction integrally with the left and right movable tables 15.

In order to move the movable tables 15 and the carriage base 21, Y-axis drive motors 23 are provided on both of the left and right ends of the frame 3. A Y-axis screw shaft 25 is rotatably provided between the left and right Y-axis drive motors 23 with rotation transmission not shown such as gear mechanisms interposed therebetween.

Meanwhile, a Y-axis ball nut 27 which is engaged with the Y-axis screw shaft 25 is mounted to the lower surface of the carriage base 21 in the center thereof, and the carriage base 21 is moved and positioned in the direction of the Y-axis as a result of rotation of the Y-axis screw shaft 25.

A carriage 31 having a clamper 29 for clamping a workpiece W is provided on the carriage base 21 such that it can move in the direction of the Y-axis (the vertical direction in FIG. 11). A carriage motor 33 is provided at each end of the carriage base 21, and an X-axis screw shaft 35 is provided between the carriage motors 33 with rotation transmission (not shown) such as gear mechanisms interposed therebetween. Further, an X-axis ball nut 37 which is engaged with the X-axis screw shaft 35 is provided on the carriage 31.

A mechanism for movement in the direction of the X-axis constituted by the carriage motors 33, X-axis screw shaft 35 and X-axis ball nut 37 provided on the carriage base 21 moves a workpiece W by driving the X-axis screw shaft 35 for rotation from both ends thereof according to the same principle as that behind the mechanism for movement in the direction of the Y-axis as described above and serves as a workpiece feeder 39 which forms a major part of the present invention.

With the above-described configuration, the Y-axis drive motors 23 drive the Y-axis screw shaft 25 for rotation to move and position the carriage base 21 in the direction of the Y-axis. Further, the carriage motors 33 drive the X-axis screw shaft 35 for rotation to move and position the carriage 31 which holds a workpiece W in the direction of the X-axis. Thus, punching is performed on a workpiece W positioned between a punch P on the upper turret 7 and a die D on the lower turret 9 by striking the punch P with the striker 11.

Next, a description will now be made with reference to drawings on a workpiece feeder of a turret punch press as an industrial machine which forms a major part of the present invention.

Figure 2:
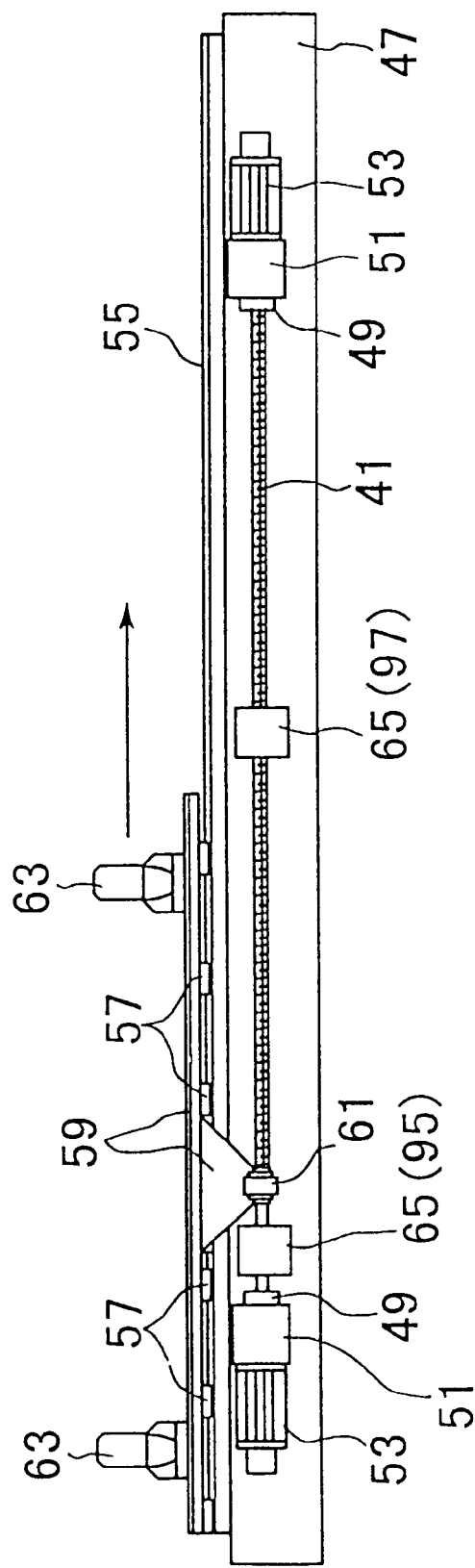
FIG. 2 is a plan view of FIG. 1.
Figure 4:
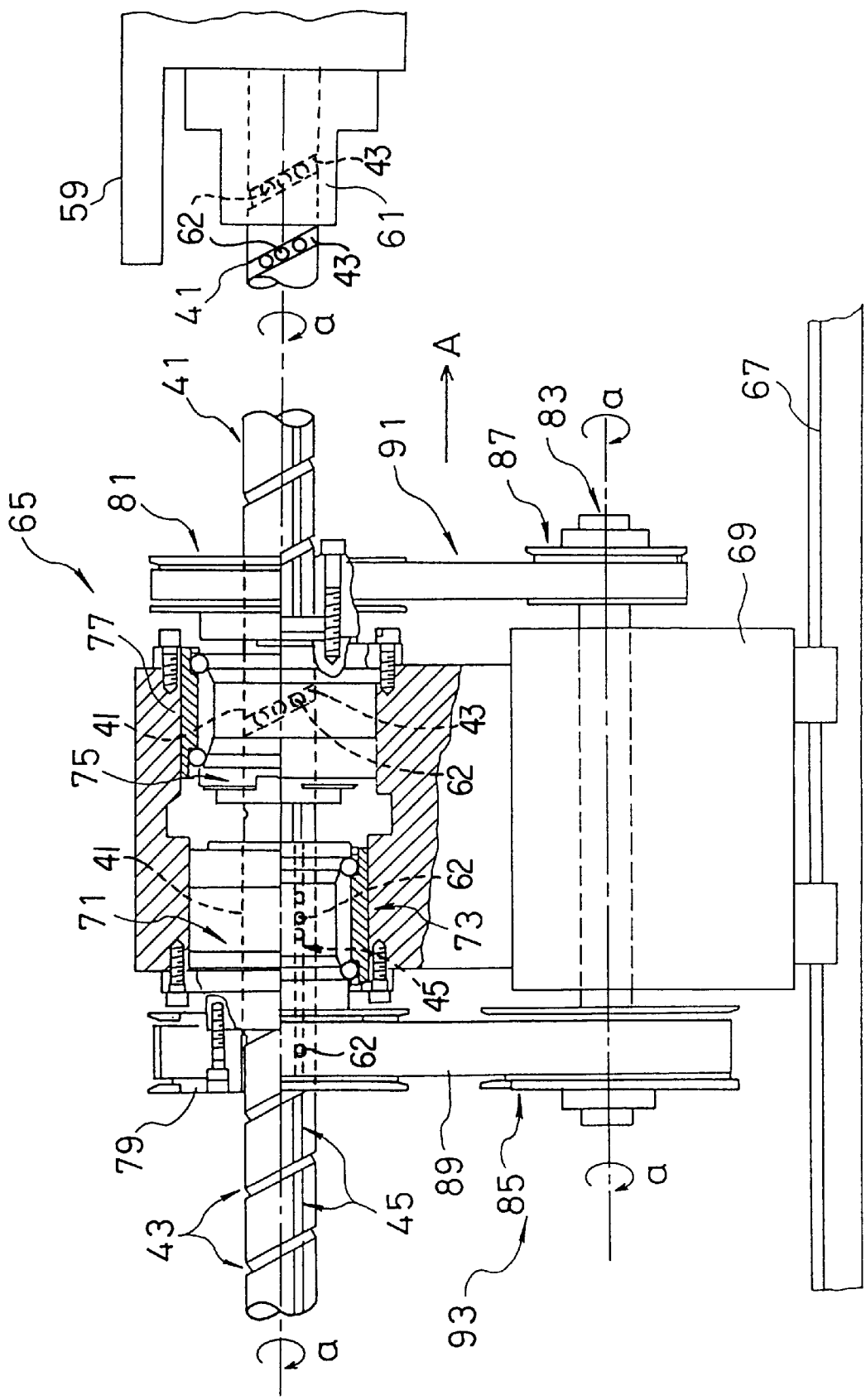
FIG. 4 is a side view including a section of a major part of an intermediate support of the feeder for a plate working machine as an industrial machine showing an example of the embodiment of the present invention.

Referring to FIGS. 1 and 2, in a workpiece feeder 39 as a feeder, a ball screw spline shaft 41 is used in place of the above-described Y-axis screw shaft 25 and X-axis screw shaft 35. As shown in FIG. 4, the ball screw spline shaft 41 has a ball screw groove 43 and a ball spline groove 45 in a crossing relationship with each other. The ball screw spline shaft 41 is rotatably supported by bearings 49 secured to a carriage base 47 on both ends thereof, and drive motors 53 (corresponding to the Y-axis drive motors 23 and carriage motors 33 of the above-described turret punch press 1) are provided on both ends of the ball screw spline shaft 41 with rotation transmission mechanisms such as a gear mechanism 51 interposed. The drive motor 53 may be provided at least on one end of the ball screw spline shaft 41.

A feeder ball nut 61 (corresponding to the Y-axis ball nut 27 and X-axis ball nut 37 of the above-described turret punch press 1) which is engaged with the ball screw groove 43 on the ball screw spline shaft 41 through balls 62 is mounted to a bottom surface of a carriage 59 (workpiece support member) having a slider 57 movable along a guide rail 55 provided so as to extend in a feeding direction (the lateral direction in FIGS. 1 and 2). A clamper 63 (corresponding to the clamper 29 of the above-described turret punch press 1) for clamping a workpiece W is provided on the carriage 59.

Thus, when the ball screw spline shaft 41 is driven by the drive motor 53 for rotation in the same direction through the rotation transmission such as the gear mechanism 51, the feeder ball nut 61 is moved along the ball screw spline shaft 41. As a result, a workpiece W clamped by the clamper 63 as an object to be fed is reciprocated in the feeding direction.

Further, intermediate supports 65 are engaged with the ball screw spline shaft 41 between the feeder ball nut 61 and the bearings 49 on both ends of the ball screw spline shaft 41. The intermediate supports 65 are driven by the rotation of the ball screw spline shaft 41 for movement in the same direction as the feeder ball nut 61 on the ball screw spline shaft 41 at a speed equal to or lower than the moving speed of the feeder ball nut 61 and travel under the guidance provided by a rail-shaped support guide 67 provided on the carriage base 47.

More specifically, as shown in FIG. 4, the intermediate support 65 comprises an intermediate support main body 69 movably provided on the support guide 67 and a spline sleeve 71 engaged with the ball spline groove 45 on the ball screw spline shaft 41 rotatably provided above the intermediate support main body 69 through a support bearing 73.

An intermediate ball nut 75 engaged with the ball screw groove 43 on the ball screw spline shaft 41 is rotatably provided above the intermediate support main body 69 through a support bearing 77.

A first pulley 79 for a toothed belt is integrally formed on the left side of the spline sleeve 71 in FIG. 4, and a second pulley 81 for a toothed belt Is integrally formed on the right side of the intermediate ball nut 75 in FIG. 4.

Further, a speed-converting shaft 83 is rotatably supported under the intermediate support main body 69 substantially in parallel with the axial direction of the ball screw spline shaft 41, and both ends of the speed-converting shaft 83 protrude from both side surfaces of the intermediate support main body 69. A third pulley 85 and a fourth pulley 87 for a toothed belt are provided on both ends of the speed-converting shaft 83.

The first pulley 79 and the third pulley 85 are configured such that they are rotated in the same direction through a toothed belt 89, and the second pulley 81 and the fourth pulley 87 are configured such that they are rotated in the same direction though a toothed belt 91.

By changing the numbers of the teeth of the first pulley 79, second pulley 81, third pulley 85 and fourth pulley 87, the speed ratio between the first pulley 79 and the second pulley 81, i.e., the speed ratio between the spline sleeve 71 and the intermediate ball nut 75, can be changed. Such a rotation transmission mechanism serves as a speed-converting rotation transmission 93 of the embodiment of the invention.

Further, according to the embodiment of the invention, the ratio of the numbers of teeth between the first pulley 79, second pulley 81 and the third pulley 85 is 1:1:1, and the ratio of the numbers of teeth between the third pulley 85 and fourth pulley 87 is 2:1. Thus, the speed ratio between the first pulley 79 and second pulley 81 is 2:1. That is, the speed ratio between the spline sleeve 71 and the intermediate ball nut 75 is 2:1.

When the ball screw spline shaft 41 rotates in the direction "a" in FIG. 4, the spline sleeve 71 rotates in the intermediate support main body 69 in the same direction "a" because it is engaged with the ball spline groove 45 on the ball screw spline shaft 41. The rotation of the spline sleeve 71 is sequentially transmitted through the first pulley 79, toothed belt 89, third pulley 85, speed-converting shaft 83, fourth pulley 87, toothed belt 91, and second pulley 81 to the intermediate ball nut 75 and, as a result, the intermediate ball nut 75 rotates in the same direction as the spline sleeve 71 at a speed of rotation which is one-half of the speed of rotation of the spline sleeve 71.

Thus, the intermediate ball nut 75 rotates in the same direction as the ball screw spline shaft 41. As a result, the difference between the speeds of rotation of the intermediate ball nut 75 and the ball screw spline shaft 41 establishes a relative moving speed of the intermediate ball nut 75 which is one-half of the moving speed of the feeder ball nut 61 on the same ball screw spline shaft 41. Therefore, the intermediate support 65 moves in the same direction as the feeder ball nut 61 (the direction A in FIG. 4) at a speed which is one-half of the moving speed of the feeder ball nut 61.

The above description will be more clearly understood from the fact that if the intermediate ball nut 75 is not rotated, the intermediate ball nut 75 is moved at the same speed as the feeder ball nut 61 and that if the intermediate ball nut 75 is rotated in the same direction and at the same speed as the ball screw spline shaft 41, the intermediate ball nut 75 is not moved because the intermediate ball nut 75 and the ball screw spline shaft 41 are stationary relative to each other.

Referring again to FIGS. 1 and 2, a first intermediate support 95 in which the speed ratio between the spline sleeve 71 and intermediate ball nut 75 as described above is 2:1 is arranged on the ball screw spline shaft 41 on the left side of the feeder ball nut 61, and a second intermediate support 97 having such a speed ratio of 2:1 is arranged on the ball screw spline shaft 41 on the right side of the feeder ball nut 61.

The first intermediate support 95 and the second intermediate support 97 are provided at an interval which is approximately and substantially one-half of the entire length L of the ball screw spline shaft 41. The ratio between the entire length L of the ball screw spline shaft 41 and the interval is able to be modified according to distances from the intermediate support 95, 97 to the feeder ball nut 61 and from ends of the ball screw spline shaft 41 to the feeder ball nut 61 in designing of the feeder for the industrial machine, namely turret punch press 1.

Figure 3A:
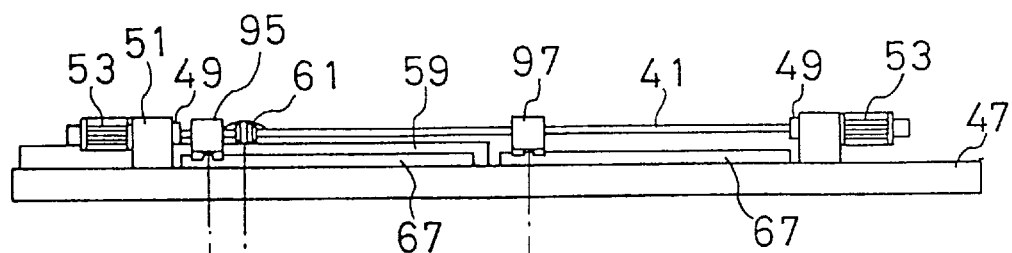
FIGS. 3A, 3B and 3C are side views illustrative of operations of the feeder for a plate working machine as an industrial machine shown in FIG. 1, respectively.

An arrangement is provided such that when the first intermediate support 95 and the feeder ball nut 61 start moving from the left end of the ball screw spline shaft 41 as shown in FIG. 3A, the second intermediate support 97 moves toward the right end of the ball screw spline shaft 41 from a position substantially in the middle thereof.

Figure 5:
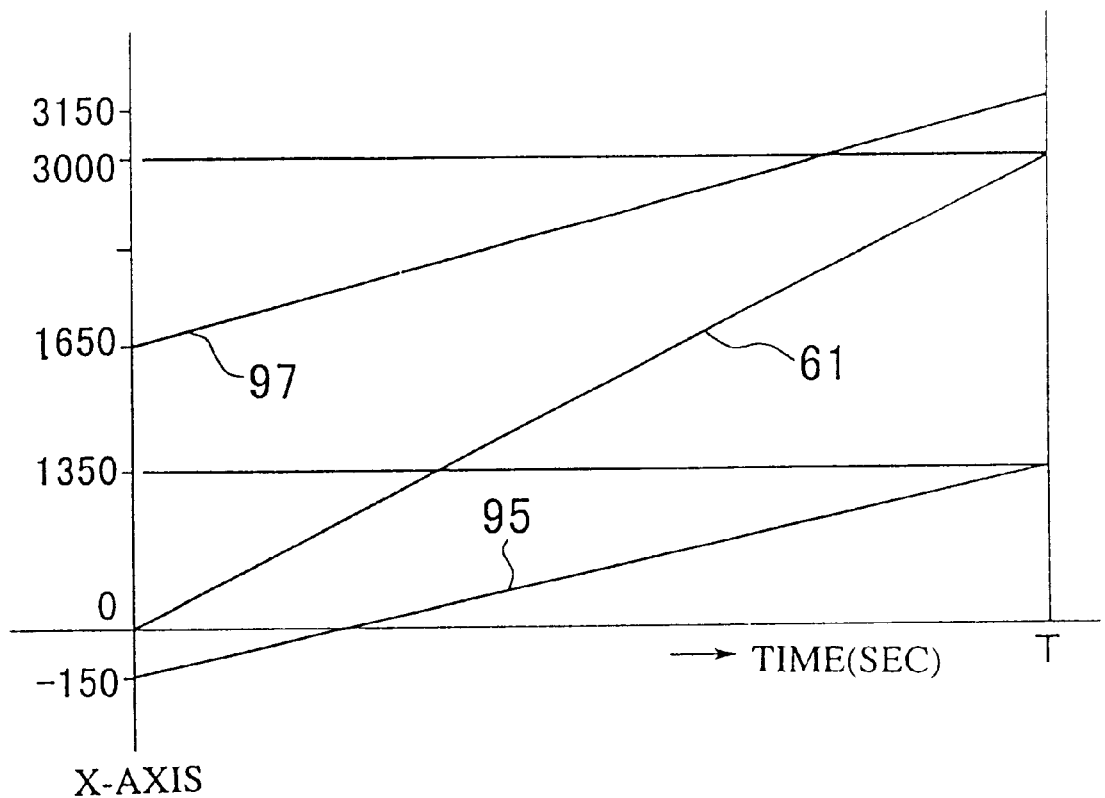
FIG. 5 illustrates the relationship between the time and distance of movement of a feeder ball nut and an intermediate support of the feeder for a plate working machine as an industrial machine.

While the rotation of the ball screw spline shaft 41 causes the first intermediate support 95, feeder ball nut 61 and second intermediate support 97 to move, for example, rightward in FIG. 3A, the feeder ball nut 61 moves such that it gradually becomes more apart from the first intermediate support 95 and closer to the second intermediate support 97 as shown in FIG. 5 because the moving speed of the feeder ball nut 61 is twice that of each intermediate support 65.

Figure 3B:
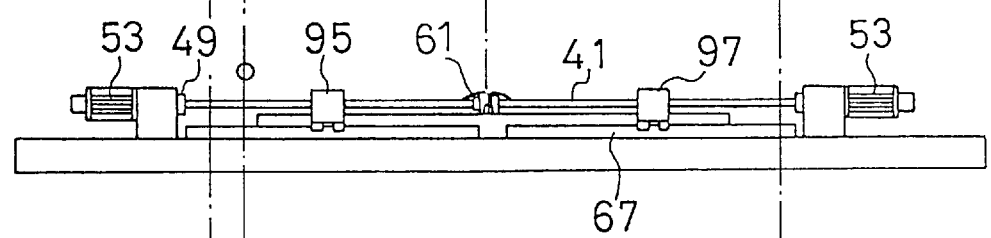

The first intermediate support 95 and the second intermediate support 97 move in constant positions which are substantially in the middle of the respective lengths of the ball screw spline shaft 41 on both sides of the feeder ball nut 61. When the feeder ball nut 61 has reached a position substantially in the middle of the entire length L of the ball screw spline shaft 41, as shown in FIG. 3B, the first intermediate support 95 and the second intermediate support 97 are located substantially in the middle of the ball screw spline shaft 41 on both sides of the feeder ball nut 61 at substantially the same distance.

Figure 3C:
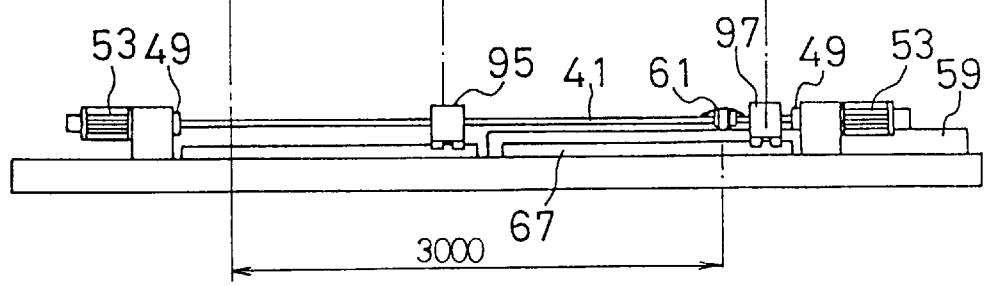

Further, the feeder ball nut 61 and the second intermediate support 97 reach the right end of the ball screw spline shaft 41 substantially at the same time as shown in FIG. 3C, and the first intermediate support 95 reaches a position substantially in the middle of the entire length L of the ball screw spline shaft 41.

Namely, an interval from the feeder ball nut 61 to the first intermediate support 95 is substantially half of an interval from the feeder ball nut 61 to the bearing 49 in the left side of the FIG. 3C. In other words, the interval from the feeder ball nut 61 to the bearing 49 in the left side of the FIG. 3C is shortened substantially half since the ball screw spline shaft 41 is supported by the first intermediate support 95 instead of the bearing 49 in the left side of the FIG. 3C.

Figure 12:
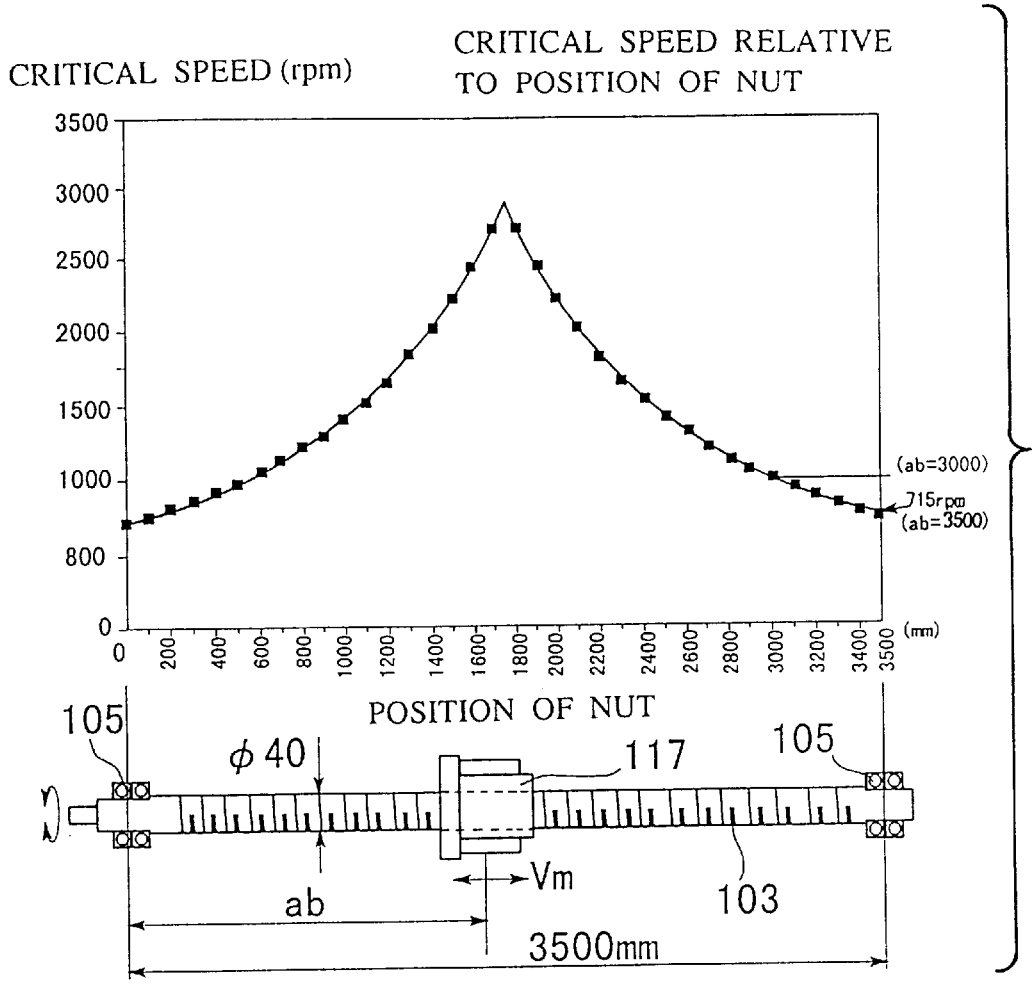
FIG. 12 is a graph showing critical speed of a ball screw relative to positions of a ball nut in a workpiece feeder of a plate working machine.

Referring now to FIG. 12, the relationship between the critical speed and the interval from the feeder ball nut 61 to the bearing 49 in the left side of the FIG. 3C and the interval from the feeder ball nut 61 to the first intermediate support 95 will be described hereinafter.

As a ball nut 117 is moved as a result of the rotation of the ball screw 103, as shown in FIG. 12, the critical speed of the ball screw 103 varies depending on the position of the ball nut 117 on the ball screw 103. In a plate working machine of the related art, since the maximum speed is set constant regardless of the position of the ball nut 117, a maximum speed Vm is set at a value lower than a critical speed calculated for the maximum value of a mounting interval "ab" (maximum mounting interval) of the ball screw 103 from the ball nut 117 to a bearing 105 in the left side of the FIG. 12. As shown in FIG. 12, in case the diameter of the ball screw 103 is 40 mm and the mounting interval "ab" is 3000 mm, the critical speed is 995 rpm form the graph in FIG. 12. Accordingly, the maximum speed Vm of the ball screw 103 must be set under than 995 rpm.

On the contrary, in the work feeder of the invention, when the feeder ball nut 61 is located at the right end in FIG. 3C and the interval ab becomes 3500, the first intermediate support 95 locates and support at the middle portion of the interval from the feeder ball nut 61 to the bearing 49 in the left side of FIG. 3C. In other wards, the status is same as the status that the ball nut 117 locates and support at the middle portion of the interval between bearings 105 and 105 of FIG. 12. Accordingly, the critical speed is near and around the convex portion of the graph in FIG. 12. Accordingly, the maximum speed Vm of the ball screw 41 is able to be set higher than that of the feeder of the related art.

As described above, the critical speed of the ball screw spline shaft 41 can be increased even if the entire length L of the ball screw spline shaft 41 is large because intermediate regions thereof are supported by the intermediate supports 65. It is therefore possible to increase the speed of rotation of the ball screw spline shaft 41, thereby allowing a workpiece to be fed at a higher speed.

Figure 8:
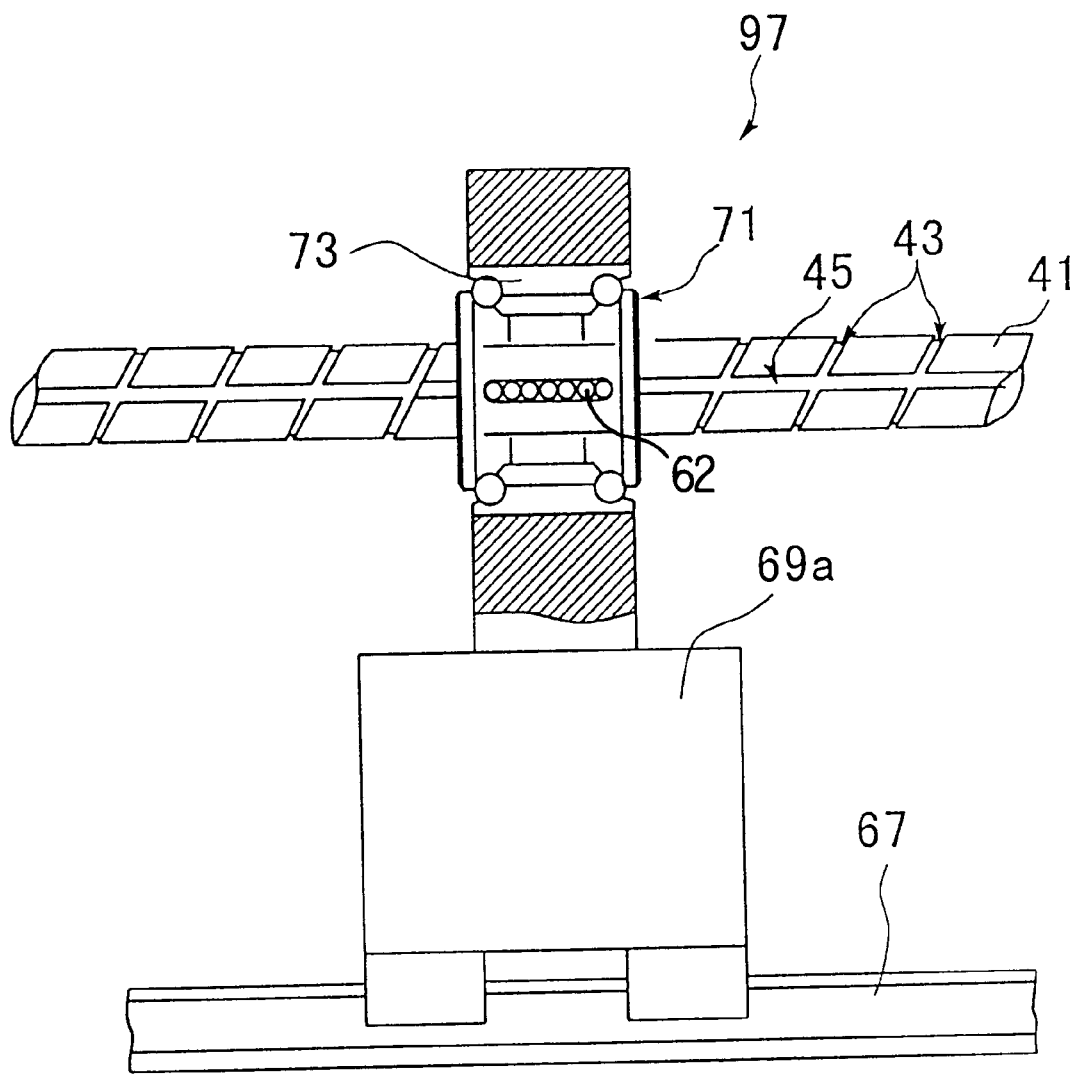
FIG. 8 is a side view including a section of the second intermediate support shown in FIG. 6.

Referring to FIG. 6, as another embodiment of the present invention, the first intermediate support 95 and the second intermediate support 97 described above may be coupled with a coupling member 99 and the intermediate ball nut 75 and speed-converting rotation transmission 93 may be omitted for one of the intermediate supports. For example, the first intermediate support 95 may include a spline sleeve 71, an intermediate ball nut 75 and a speed-converting rotation transmission 93 like that shown in FIG. 4 while the second intermediate support 97 may have a configuration as shown in FIG. 8 including an intermediate support main body 69a movable provided on a support guide 67 and a spline sleeve 71 rotatably provided within the intermediate support main body 69a through a support bearing 73. The cost of the second intermediate support 97 can be reduced because the intermediate ball nut 75 and speed-converting rotation transmission 93 are omitted.

Since the first intermediate support 95 moves in response to the rotation of the ball screw spline shaft 41 at a speed which is one-half of that of the feeder ball nut 61, the second intermediate support 97 also moves in the same direction integrally with the first intermediate support 95 through the coupling member 99. The second intermediate support 97 supports the ball screw spline shaft 41 through the spline sleeve 71 while it moves along the ball spline groove 45 on the ball screw spline shaft 41.

In this case, the actions as illustrated in FIGS. 7A, 7B and 7C take place to provide the same operation as shown in FIG. 3.

Figure 9:
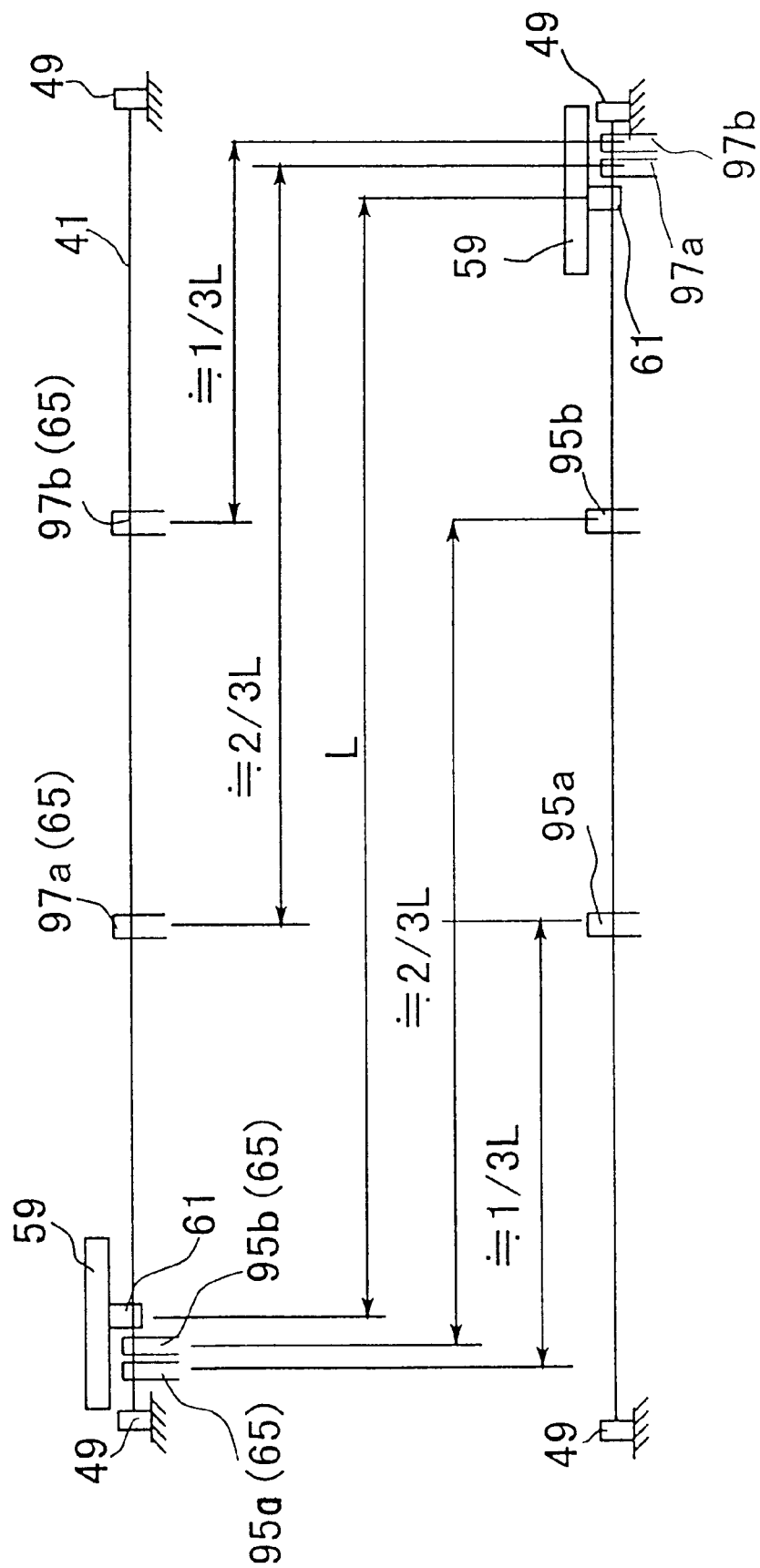
FIG. 9 is a schematic view illustrative of an operation of a feeder for a plate working machine as an industrial machine showing an example of still another embodiment of the present invention.

Referring now to FIG. 9, as still another embodiment of the present invention, a plurality of intermediate supports 65 identical to that shown in FIG. 4 may be provided on each of the regions of the ball screw spline shaft 41 on both sides of the feeder ball nut 61, respectively.

While two first intermediate supports 95a and 95b are arranged on the ball screw spline shaft 41 on the left side of the feeder ball nut 61 in FIG. 9, two second intermediate supports 97a and 97b are arranged on the ball screw spline shaft 41 on the right side of the feeder ball nut 61 in FIG. 9.

The moving speed of the first intermediate support 95b and the second intermediate support 97a, i.e., intermediate supports 65 located closer to the feeder ball nut 61 on both sides thereof, is set at a value which is two-thirds of the moving speed of the feeder ball nut 61. The moving speed of the first intermediate support 95a and the second intermediate support 97b, i.e., intermediate supports 65 located further from the feeder ball nut 61 on both sides thereof, is set at a value which is one-third of the moving speed of the feeder ball nut 61.

When the first intermediate supports 95a and 95b on the left-hand side of FIG. 9 and the feeder ball nut 61 are located at the left end of the ball screw spline shaft 41, the second intermediate support 97a on the right-hand side is in a position at a distance from the right end of the ball screw spline shaft 41 which is substantially two-thirds of the entire length L of the ball screw spline shaft 41, and the second intermediate support 97b is in a position at a distance from the right end which is substantially one-third of the entire length L of the ball screw spline shaft 41.

When the ball screw spline shaft 41 rotates to cause the feeder ball nut 61 to move from the left end to the right end of the ball screw spline shaft 41, the two first intermediate supports 95a and 95b on the left-hand side move toward the opposite end while expanding the interval between them such that the distance between the feeder ball nut 61 and the left end of the ball screw spline shaft 41 is always divided into three substantially equal distances.

The two second intermediate supports 97a and 97b on the right-hand side also move toward the right end while decreasing the interval between them such that the distance between the feeder ball nut 61 and the right end of the ball screw spline shaft 41 is always divided into three substantially equal distances.

When the feeder ball nut 61 reaches the right end of the ball screw spline shaft 41, the first intermediate support 95a on the left-hand side reaches a position at a distance from the left end which is substantially one-third of the entire length L of the ball screw spline shaft 41, and first intermediate support 95b reaches a position at a distance from the left end of the ball screw spline shaft 41 which is substantially two-thirds of the entire length L of the ball screw spline shaft 41. The two second intermediate supports 97a and 97b on the right-hand side reach the right end substantially at the same time.

As described above, a long ball screw spline shaft 41 can be handled theoretically by attaching many intermediate supports 65. By providing a plurality of intermediate supports as described above, a ball screw spline shaft 41 can be supported at relatively small intervals and, as a result, the critical speed of the ball screw spline shaft 41 can be increased to increase the speed of rotation of the ball screw spline shaft 41.

For example, in a case that three first intermediate supports 95a, 95b and 95c are arranged on the left-hand side of a feeder ball nut 61 and three second intermediate supports 97a, 97b and 97c are provided on the right-hand side of the feeder ball nut 61, the moving speed of the first intermediate support 95c and the second intermediate support 97a, i.e., the intermediate supports on both sides of the feeder ball nut 61 closest thereto, is set at three quarters of the moving speed of the feeder ball nut 61; the moving speed of the first intermediate support 95b and the second intermediate support 97b, i.e., the next intermediate supports further from the feeder ball nut 61 on both sides thereof, is set at one-half of the moving speed of the feeder ball nut 61; and the moving speed of the first intermediate support 95a and the second intermediate support 97c, i.e., the intermediate supports furthest from the feeder ball nut 61 on both sides thereof, is set at one quarter of the moving speed of the feeder ball nut 61.

When the ball screw spline shaft 41 rotates to cause the feeder ball nut 61 to move on the ball screw spline shaft 41, the three first intermediate supports 95a, 95b and 95c on the left-hand side move such that the distance between the feeder ball nut 61 and the left end of the ball screw spline shaft 41 is always divided into four equal distances, and the three second intermediate supports 97a, 97b and 97c on the right-hand side move such that the distance between the feeder ball nut 61 and the right end of the ball screw spline shaft 41 is always divided into four equal distances.

The present invention is not limited to the above-described embodiment of the invention and may be implemented in other modes by making appropriate modifications. Although the present example of the embodiment of the invention has referred to a turret punch press as an industrial machine, the present invention may be applied to other types of punch presses, plate working machines such as laser working machines, and transportation machines.

While preferred embodiments of the present invention have been described using specific terms, such description is for illustrative purposes, and it is to be understood that changes and variations may be made without departing from the spirit or scope of the following claims.

What is claimed is:

1. A feeder for an industrial machine, comprising:
    a ball screw spline shaft formed with a ball screw thread groove and a ball spline groove in a crossing relationship with each other and rotatably supported on both ends thereof;
    a drive motor provided on at least one end of the ball screw spline shaft;
    a feeder ball nut engaged with the ball screw spline shaft;
    an object to be fed to which the feeder ball nut is attached;
    an intermediate support driven directly by the rotation of the ball screw spline shaft for movement on the ball screw spline shaft in the same direction as the feeder ball nut at a speed which is at least equal to or lower than the moving speed of the feeder ball nut; and
    a support guide for guiding the intermediate support in a manner such that the intermediate support is movably supported.

2. The feeder for an industrial machine according to claim 1, wherein the intermediate support is driven by the rotation of the ball screw spline shaft at a speed which is lower than the moving speed of the feeder ball nut.

3. The feeder for an industrial machine according to claim 1, wherein the intermediate support further including:
    an intermediate support main body movably provided on the support guide;
    a spline sleeve engaged with the ball spline groove of the ball screw spline shaft and rotatably provided in the intermediate support main body;
    an intermediate ball nut engaged with the ball screw thread groove on the ball screw spline shaft and rotatably provided in the intermediate support main body; and
    a speed-converting rotation transmission for transmitting the rotation of the spline sleeve to the intermediate ball nut in the same direction with the speed of rotation converted.

4. The feeder for an industrial machine according to claim 3, wherein
    the plurality of intermediate supports are provided on the ball screw spline shaft on each side of the feeder ball nut;
    the moving speed of the plurality of intermediate supports are set at a value lower than the moving speed of the feeder ball nut; and
    the moving speed of intermediate support among the plurality of intermediate supports which is further from the feeder ball nut is set at a value lower than that of the other of the intermediate support which is closer to the feeder ball nut.

5. The feeder for an industrial machine according to claim 3, wherein the speed-converting rotation transmission comprises:
    a first pulley on the spline sleeve for rotation with the spline sleeve;
    a second pulley on the intermediate ball nut for rotation with the intermediate ball nut;
    a speed converting shaft having a third pulley and a fourth pulley thereon for rotation with the speed converting shaft;
    a first toothed belt for transmitting the rotation of the first pulley to the third pulley; and
    a second toothed belt for transmitting the rotation of the fourth pulley to the second pulley.

6. The feeder for an industrial machine according to claim 5, wherein the first, second, third, and fourth pulleys have numbers of teeth selected to provide a speed ratio between the first pulley and the second pulley such that the speed of rotation is changed.

7. The feeder for an industrial machine according to claim 6, wherein the speed ratio is 2:1.

8. A feeder for an industrial machine, comprising:
    a ball screw spline shaft formed with a ball screw thread groove and a ball spline groove in a crossing relationship with each other and rotatably supported on both ends thereof;
    a drive motor provided on at least one end of the ball screw spline shaft;
    a feeder ball nut engaged with the ball screw spline shaft;
    an object to be fed to which the feeder ball nut is attached;
    an intermediate support driven by the rotation of the ball screw spline shaft for movement on the ball screw spline shaft in the same direction as the feeder ball nut at a speed which is at least equal to or lower than the moving speed of the feeder ball nut; and
    a support guide for guiding the intermediate support in a manner such that the intermediate support is movably supported;
    said intermediate support comprising:
        an intermediate support main body movably provided on the support guide;
        a spline sleeve engaged with the ball spline groove of the ball screw spline shaft and rotatably provided in the intermediate support main body;
        an intermediate ball nut engaged with the ball screw thread groove on the ball screw spline shaft and rotatably provided in the intermediate support main body; and
        a speed-converting rotation transmission for transmitting the rotation of the spline sleeve to the intermediate ball nut in the same direction with the speed of rotation converted;
    wherein:
        the moving speed of the intermediate support is set at one-half of the moving speed of the feeder ball nut.

9. The feeder for an industrial machine according to claim 8, wherein
    the two intermediate supports are coupled to each other with a coupling member; and
    one of the intermediate supports comprises an intermediate support main body movably provided on the support guide and a spline sleeve engaged with the ball spline groove of the ball screw spline shaft and rotatably provided on the intermediate support main body.

10. A feeder for an industrial machine, comprising:
a ball screw spline shaft formed with a ball screw thread groove and a ball spline groove in a crossing relationship with each other and rotatably supported on both ends thereof;
a drive motor provided on at least one end of the ball screw spline shaft;
a feeder ball nut engaged with the ball screw spline shaft;
an object to be fed to which the feeder ball nut is attached;
intermediate supports driven directly by the rotation of the ball screw spline shaft for movement on the ball screw spline shaft in the same direction as the feeder ball nut at a speed which is lower than the moving speed of the feeder ball nut, the intermediate supports arranged on both sides of the feeder ball nut; and
a support guide for guiding the intermediate supports in a manner such that the intermediate supports are movably supported.

11. The feeder for an industrial machine according to claim 10, wherein the intermediate support further including:
an intermediate support main body movably provided on the support guide;
a spline sleeve engaged with the ball spline groove of the ball screw spline shaft and rotatably provided in the intermediate support main body;
an intermediate ball nut engaged with the ball screw thread groove on the ball screw spline shaft and rotatably provided in the intermediate support main body; and
a speed-converting rotation transmission for transmitting the rotation of the spline sleeve to the intermediate ball nut in the same direction with the speed of rotation converted.

12. The feeder for an industrial machine according to claim 11, wherein
the plurality of intermediate supports are provided on the ball screw spline shaft on each side of the feeder ball nut;
the moving speed of the plurality of intermediate supports are set at a value lower than the moving speed of the feeder ball nut; and
the moving speed of intermediate support among the plurality of intermediate supports which is further from the feeder ball nut is set at a value lower than that of the other of the intermediate support which is closer to the feeder ball nut.

13. A feeder for an industrial machine, comprising:
a ball screw spline shaft formed with a ball screw thread groove and a ball spline groove in a crossing relationship with each other and rotatably supported on both ends thereof;
a drive motor provided on at least one end of the ball screw spline shaft;
a feeder ball nut engaged with the ball screw spline shaft;
an object to be fed to which the feeder ball nut is attached;
intermediate supports driven by the rotation of the ball screw spline shaft for movement on the ball screw spline shaft in the same direction as the feeder ball nut at a speed which is lower than the moving speed of the feeder ball nut, the intermediate supports arranged on both sides of the feeder ball nut; and
a support guide for guiding the intermediate supports in a manner such that the intermediate supports are movably supported;
each of the intermediate supports comprising:
an intermediate support main body movably provided on the support guide;
a spline sleeve engaged with the ball spline groove of the ball screw spline shaft and rotatably provided in the intermediate support main body; and
a speed-converting rotation transmission for transmitting the rotation of the spline sleeve to the intermediate ball nut in the same direction with the speed of rotation converted;
wherein:
the intermediate supports are arranged on the ball screw spline shaft on both sides of the feeder ball nut;
the two intermediate supports are spaced at an interval being substantially one-half of the entire length of the ball screw spline shaft; and
the moving speed of the intermediate supports is set at one-half of the moving speed of the feeder ball nut.

14. The feeder for an industrial machine according to claim 13, wherein
the two intermediate supports are coupled to each other with a coupling member; and
one of the intermediate supports comprises an intermediate support main body movably provided on the support guide and a spine sleeve engaged with the ball spline groove of the ball screw spline shaft and rotatably provided on the intermediate support main body.

15. An industrial machine utilizing a feeder, comprising:
an erected frame;
a plurality of punches supported by the erected frame;
a striker for striking the plurality of punches;
a ball screw spline shaft formed with a ball screw thread groove and a ball spline groove in a crossing relationship with each other and rotatably supported on both ends thereof;
a drive motor provided on at least one end of the ball screw spline shaft;
a feeder ball nut engaged with the ball screw spline shaft;
an object to be fed to which the feeder ball nut is attached;
intermediate supports driven directly by the rotation of the ball screw spline shaft for movement on the ball screw spline shaft in the same direction as the feeder ball nut at a speed which is lower than the moving speed of the feeder ball nut, the intermediate supports arranged on both sides of the feeder ball nut; and
a support guide for guiding the intermediate supports in a manner such that the intermediate supports are movably supported.

16. The industrial machine according to claim 15, further comprising:
an upper turret rotatably connected to the erected frame for holding the plurality of punches; and
a lower turret rotatably connected to the erected frame for holding the plurality of punches,
wherein the industrial machine is a turret punch press.

* * * * *